Nov. 6, 1956     D. R. DE BOISBLANC     2,769,341
PRESSURE BALANCE INDICATOR

Filed June 2, 1952     2 Sheets-Sheet 1

INVENTOR.
D. R. De BOISBLANC
BY *Hudson & Young*
ATTORNEYS

Nov. 6, 1956  D. R. DE BOISBLANC  2,769,341
PRESSURE BALANCE INDICATOR
Filed June 2, 1952  2 Sheets-Sheet 2

INVENTOR.
D. R. De BOISBLANC
BY Hudson & Young
ATTORNEYS

United States Patent Office 2,769,341
Patented Nov. 6, 1956

2,769,341

PRESSURE BALANCE INDICATOR

Deslonde R. de Boisblanc, Idaho Falls, Idaho, assignor to Phillips Petroleum Company, a corporation of Delaware Application June 2, 1952, Serial No. 291,218

5 Claims. (Cl. 73—398)

This invention relates to pressure indicating means. In another aspect it relates to apparatus for measuring the vapor pressure of fluids.

The method generally employed to determine the vapor pressure of a liquid consists of placing a predetermined amount of the liquid under consideration in a vessel or a bomb, this vessel being provided with a region above the liquid level which is connected to a pressure gauge for indicating the vapor pressure when the liquid in the vessel reaches equilibrium with its vapor. Such devices normally are maintained at a predetermined temperature such that comparisons between the pressures of different liquids can readily be made. However, for many applications conventional pressure gauges do not possess the desired degree of sensitivity. To overcome this difficulty, the reading of the pressure gauge first is noted when the gauge is connected to the vapor region above the vessel, and then the pressure gauge is removed from the vessel and connected to a source of variable pressure having a sensitive instrument such as a manometer connected thereto. The source of variable pressure is adjusted until the gauge indicates the reading previously noted for testing the vapor. The actual vapor pressure of the fluid under consideration thus is indicated by the corresponding manometer reading. In this manner variations in calibration of the pressure gauge are compensated, thereby resulting in greater accuracy being obtained than is possible by direct reading. Because this procedure requires removal of the pressure gauge from the vessel each time a vapor pressure determination is made, it should be apparent that various errors are likely to be made.

In order to overcome these difficulties, pressure balance indicators recently have been developed which employ the principle of balancing the unknown vapor pressure against a second known pressure by means of a flexible diaphragm. Balance is indicated by a predetermined flexure of the diaphragm and the value of the second pressure is read on a manometer. The present invention is directed toward providing improved pressure indicating means based upon this balance principle.

Accordingly, it is an object of this invention to provide improved apparatus for measuring vapor pressure by the pressure balance principle.

It is another object to provide apparatus for measuring fluid pressures in an automatic manner.

It is a further object to provide improved indicating means for use with pressure balance instruments.

It is a still further object to provide apparatus for carrying out the above mentioned objects which is reliable in operation, economical to construct, and which provides a high degree of sensitivity.

Various other objects and advantages and features of this invention should become apparent from the following detailed description taken in conjunction with the accompanying drawings in which.

Figure 1:
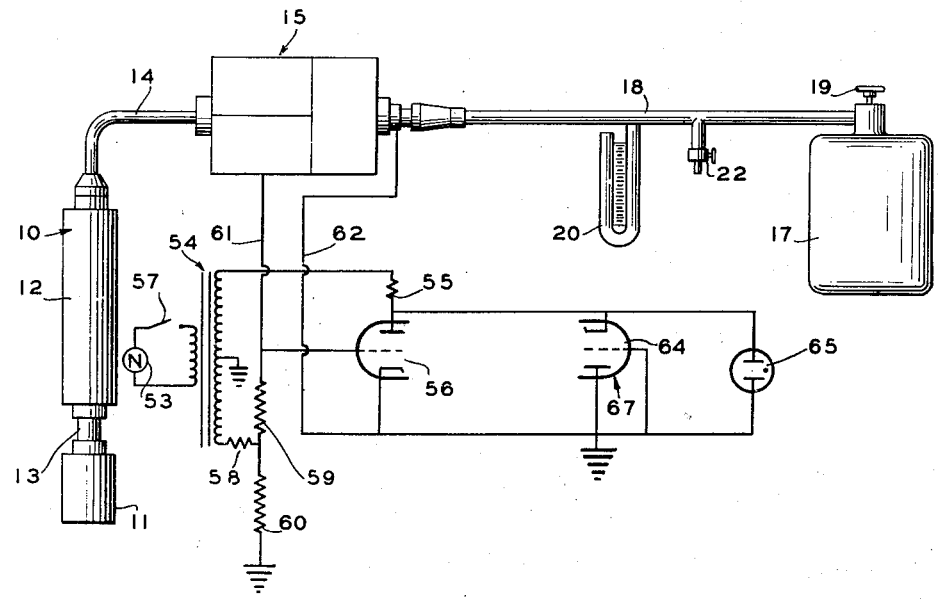
Figure 1 is a front elevational view of the apparatus for determining vapor pressures.

Referring now to the drawings in detail and to Figure 1 in particular, there is illustrated a conventional vessel or bomb 10 of the type generally used in making vapor pressure determinations. This vessel includes a liquid receptacle 11 communicating with a vapor containing region 12 through a conduit 13. In operation of this apparatus, receptacle 11 is filled to a predetermined level with a liquid whose vapor pressure is to be measured. As a result, vapor exists in region 12 at a pressure which is characteristic of the liquid under consideration. The liquid and vapor preferably are maintained at a constant temperature during the entire vapor pressure determination, and the apparatus normally is provided with a pressure gauge at its upper end which indicates directly the vapor pressure therein. This form of apparatus is designed such that receptacle 11 can be removed and immersed in the liquid to be tested so as to fill the vessel to a preselected level, although it should be noted that when it is desired to sample a liquid under high pressure the unit 10 can be provided with valves for admitting and removing the vapor as those skilled in the art will readily understand.

The upper end of unit 10 is connected by a conduit 14 to a pressure balance device 15. A source of balance pressure is provided by a tank 17 which contains a gas such as nitrogen at a pressure higher than the vapor pressure being measured. Tank 17 communicates with the opposite end of device 15 by a conduit 18, and is provided with a valve 19 to regulate the pressure admitted to conduit 18. Conduit 18 preferably is formed at least in part of a flexible material which can readily be connected to pressure balance device 15. A manometer pressure gauge 20 is provided in communication with conduit 18 to indicate the pressure, and an exhaust valve 22 is provided in said conduit 18 for venting the pressure as may be desired. In operation, the pressure in conduit 18 is adjusted until equal to the vapor pressure of the liquid to be tested as indicated by the electrical circuit associated with device 15. When the two pressures are balanced the vapor pressure of the test liquid is read upon manometer scale 20. In this manner the difficulties inherent in the direct use of conventional pressure gauge are eliminated, and where extreme accuracy is necessary it is not required to remove the pressure gauge from the test unit for subsequent connection to a manometer each time a vapor pressure determination is made.

Figure 2:
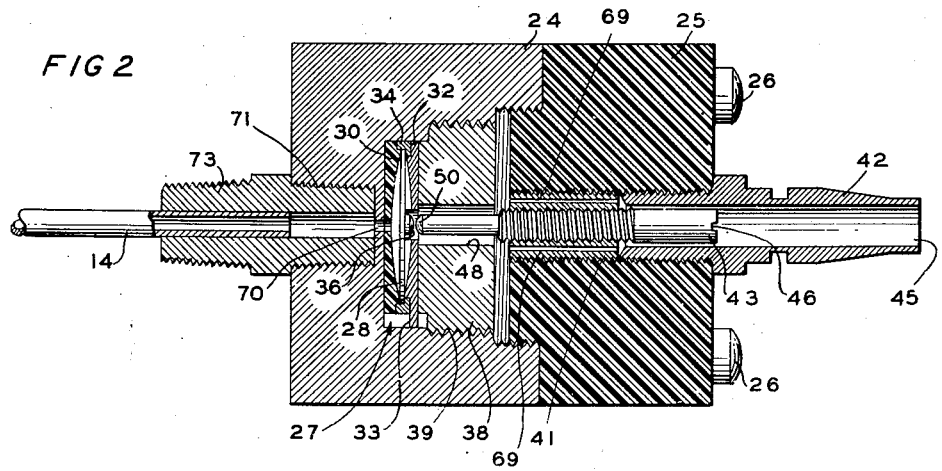
Figure 2 is a vertical sectional view of the pressure balance indicator.
Figure 3:
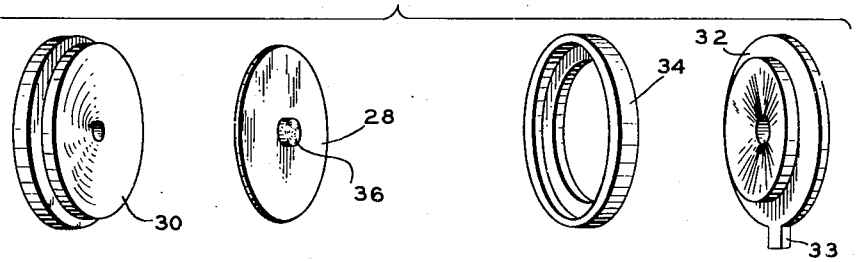
Figure 3 is a view of the diaphragm and cooperating elements employed in the indicator of Figure 2 with the parts illustrated in disassembled relation.

The pressure balance device of the present invention is shown in detail in Figures 2 and 3. This device includes a casing 24 having a sleeve member 25 telescoped therein and secured thereto by bolts 26. Casing 24 is shaped to form a chamber 27 having a flexible diaphragm 28 supported therein by a structure which includes an apertured pressure sealing plate 30 mounted on one side of diaphragm 28 and an apertured plate 32 mounted on the other side of diaphragm 28. Plate 30 is formed of a sealing material such as "Teflon." Plate 32 is provided with a lug 33 extending from the periphery thereof to engage a corresponding slot formed in diaphragm chamber 27, this slot cooperating with lug 33 to prevent rotation of plate 32. A circular ring 34 is soldered to the periphery of diaphragm 28 to support diagram 28 of the chamber, and a small electrical contact disc 36 is soldered on one side of diaphragm 28 opposite the aperture in plate 32. In order to force the elements of the diaphragm chamber into proper assembled position plate 32 is engaged by a retainer plug 38 which is mounted in an enlarged threaded passage 39 formed in casing 24.

Sleeve member 25 is constructed of electrically insulating material, such as Bakelite, and has an interior threaded passage which is shaped to receive both a threaded metal bushing 41 and an inlet conduit fitting 42, the latter being adapted for connection to conduit 18. Bushing 41, in turn has a threaded interior passage which receives a contact rod 43 having a threaded portion engageable with the interior threads in bushing 41. One end of contact rod 43 protrudes into a passage 45 in fitting 42 and is provided with a slot 46 to facilitate longitudinal adjustment of contact rod 42 by rotation thereof in bushing 41. The other end of contact rod 46 extends through a passage 48 in retainer plug 38 and through the aperture in plate 32 so that its end portion 50 is closely spaced to contact disk 36. When diaphragm 28 is flexed to a predetermined position contact disc 36 engages end 50 of contact rod 43, thereby completing an electrical circuit between contact rod 42, diaphragm 28, casing 24 and the indicating circuit illustrated in Figure 1.

This indicating circuit consists of a source of alternating potential 53 applied to the primary coil of a transformer 54 through a switch 57. One end terminal of the secondary coil of transformer 54 is connected through a resistor 55 to the anode of a vacuum tube triode 56. The second end terminal of the secondary coil of transformer 54 is connected to the control grid of tube 56 through series resistors 58 and 59. The center tap of the secondary coil of transformer 54 is maintained at ground potential. The junction between series resistors 58 and 59 also is connected to ground through a resistor 60. A lead 61 connects the control grid of tube 56 to casing 24, which is in electrical contact with disc 36 through support ring 34 and diaphragm 28. A lead 62 connects the grounded cathode of tube 56 to fitting 42, which in turn is in electrical contact with rod 43. The anode of tube 56 is connected to the cathode of a second vacuum tube triode 64, and the cathode of tube 56 is connected to the anode of tube 64. The control grid of tube 64 is connected directly to the anode of said tube which in effect converts triode 64 into a diode. It should be apparent that a diode could be employed in place of triode 64, although for economy of construction a single double triode 67 has been employed, which tube contains the two triode section 56 and 64. A neon flasher tube 65 is connected parallel with tube 64.

It will be apparent that fluid pressure from conduit 18 is admitted into the diaphragm chamber through passage 45, a plurality of apertures 69 in bushing 41, passage 48, and the aperture in plate 32 to that side of diaphragm 28 upon which is attached contact disc 36. The other end of the diaphragm chamber connected to pressure bomb 10 through an opening 70 communicating with an enlarged threaded outlet passage 71 in casing 24. A coupling 73 is threaded into passage 71 to join conduit 14 therewith, the outer portion of coupling 73 being threaded to engage a larger diameter coupling conduit 14 if desired. In operation, contact disc 36 initially is in engagement with end 50 of contact rods 43, with the pressure in conduit 18 being less than the pressure in bomb 10. Thereupon, the pressure in conduit 18 gradually is increased by opening valve 19 until contact between disc 36 and rod 43 is broken, thus indicating that the two pressures are balanced. Exhaust valve 22 is provided to release the pressure within conduit 18 between subsequent measurements and also for obtaining more accurate adjustment near the balance point. At the condition of balance between the vapor pressure in bomb 10 and conduit 18 the magnitude of this pressure is read on manometer 20 in the manner previously explained.

The point of balance between the pressures in conduits 14 and 18 is indicated by the associated electrical circuit. At long as the pressure in conduit 14 exceeds that in conduit 18, disc 36 remains in electrical contact with end 50 of rod 43. This serves to complete an electrical connection between leads 61 and 62, which in effect connects the control grid of tube 56 to ground. During the first half cycles of applied voltage when the potential at the anode of tube 56 is above a predetermined positive value with respect to ground, tube 56 is conductive. During these first half cycles tube 64 is non-conductive because the anode thereof is maintained at ground potential while the cathode is at a positive value. During the second half cycles of applied voltage tube 56 is non-conductive because the anode is maintained at a negative value. However, triode 64 is conductive during the portion of these second half cycles when the potential at the cathode is at a predetermined negative value with respect to the grounded anode. Neon flasher 65, which is connected in parallel with tubes 56 and 64, becomes conductive only when a predetermined potential is applied thereacross. Because tube 56 is conductive during a portion of the first half cycles of applied voltage and tube 64 is conductive during a portion of the second half cycles, the potential needed to fire tube 65 is not reached due to the resulting potential drop across resistor 55.

Once the pressure in conduit 18 becomes equal to the pressure in conduit 14, the electrical connection between end 50 of rod 43 and contact disc 36 is broken thereby removing the grounded connection to the control grid of tube 56. Accordingly, during the first half cycles of applied voltage when the anode of tube 56 becomes positive, the control grid of tube 56 is maintained at a negative value which prevents current from passing through tube 56. As a result the potential applied across neon flasher 65 is sufficient to cause firing thereof to provide a visual indication that the pressure in conduit 18 is equal to that in conduit 14. During the second half cycles of applied voltage tube 56 is non-conductive, but tube 64 is conductive when the potential on the cathode reaches a predetermined negative value. This conduction of current through tubes 64 reduces the potential across tube 65 thereby extinguishing the current flow therethrough. Thus, when electrical contact is broken between disc 36 and rod 43 tube 65 flashes at a frequency equal to the frequency of voltage source 53.

Figure 4:
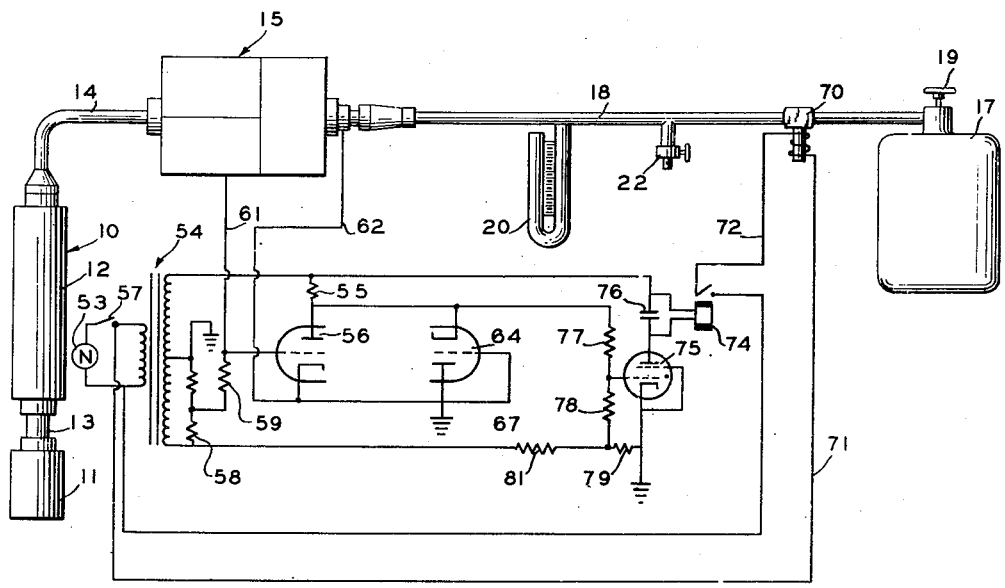
Figure 4 is a modified form of the apparatus illustrated in Figure 1 which is automatic in operation.

In Figure 4 there is illustrated a modified form of the pressure balance indicating system which is adapted to regulate automatically the pressure in conduit 18 to secure a balance with the measured vapor pressure in conduit 14. The apparatus is similar to that illustrated in Figure 1 and corresponding parts are designated by like reference numerals. A solenoid operated valve 70 is disposed in conduit 18 to regulate the pressure applied to the diaphragm chamber from tank 17. The solenoid coil of valve 70 is energized from source voltage 53 by leads 71 and 72, the latter being connected through relay 74. The electrical circuit shown in Figure 4 is essentially the same as that illustrated in Figure 1 except that neon flasher tube 65 is replaced by a circuit adapted to selectively energized relay 74 for regulating the pressure applied through solenoid valve 70. To this end a thyratron tube 75 is provided having the anode thereof connected through the coil of relay 74 to the first end terminal of the secondary winding of transformer 54. The coil of relay 74 is shunted by a capacitor 76. The common junction of the anode of tube 56 and the cathode of tube 64 is connected to ground through a potential dividing net work comprising series resistors 77, 78 and 79, the junction between resistors 77 and 78 being connected to the control grid of tube 75. The junction between resistors 78 and 79 is connected to the second end terminal of the secondary winding of transformer 54 through a resistor 81, and the cathode of tube 75 is connected to ground. As a specific example, the following values of circuit components have been found to operate in an efficient manner: resistors 55, 77 and 78, 5 megohms each; resistors 79 and 81, 500,000 ohms each; resistor 59, 7 megohms; resistor 60, 10,000 ohms; resistor 58, 330,000 ohms; capacitor 76, 8 microfarads; tube 67, 2C51; and tube 75, 2D21.

The operation of the automatic balancing circuit should now become apparent. Valve 70 normally is maintained in an open position, that is in the absence of energizing current being applied to the solenoid coil, valve 70 remains open to pass the fluid from tank 17 through conduit 18 to the balancing device 15. As long as the pressure in conduit 18 remains less than that in conduit 14 disc 36 remains in electrical contact with rod 43, which in turn maintains the control grid in tube 56 at ground potential as previously described. Because tube 56 conducts during first half cycles of applied voltage and tube 64 conducts during the second half cycles, the potential on the control grid of tube 75 is not sufficient to fire said tube because of the potential drop across resistor 55. However, when the pressure in conduit 18 equals that in conduit 14, the connection between the leads 61, 62 is broken, thereby removing the ground potential from the control grid of tube 56. As previously described this results in neither tube 56 nor tube 64 being conductive during the first half cycles of applied voltage when the anode of tube 56 is positive with respect to ground. Accordingly, the potential at the junction of resistors 77 and 78 is sufficient to initiate current flow through tube 75 which energizes the coil of relay 74 thereby energizing the solenoid coil of valve 70 from source 53 to close valve 70. Thus, as long as the pressure in conduit 18 is less than that in conduit 14 valve 70 remains open to increase the pressure in conduit 18. Once the pressure in conduit 18 is equal to the pressure in conduit 14 valve 70 is closed by operation of the associated electrical circuit. This operation provides automatic adjustment of the pressure on both sides of diaphragm 28 to establish a condition of balance. A second mode of operation is to open valve 22 slightly to permit a continuous leak of balancing fluid to atmosphere. Thus, should excessive pressure be applied to the diaphragm chamber from conduit 18 this excess pressure is bled off through valve 22 until contact is again established between disc 36 and rod 43 at which time valve 70 again is opened.

It is a feature of this invention that diaphragm 28 cannot be injured due to an excessive pressure differential between the two sides of the diaphragm chamber. This is accomplished by providing support plates 30 and 32 with concave faces having small apertures therein. Diaphragm 28 thus can flex freely to the extent permitted by the concave faces of plates 30 and 32, but application of an extreme pressure differential between the two sides of the chamber causes the diaphragm to engage one of the plates 30, 32 thereby preventing further flexure of the diaphragm with resulting damage. The diaphragm assembly is secured in a securely locked position by retainer plug 38 without disturbing the free access of fluid to the sides of the chamber through passages 48 and 70. Adjustable contact rod 43 permits the unit to be positioned such that the diaphragm operates at its region of greatest sensitivity. Because adjusting slot 46 of contact rod 43 is contained within fitting 42 there is little danger of accidental variance of the adjustment setting.

The apparatus constructed in accordance with the present invention has been found to be very reliable in operation and extremely sensitive. For example, it has been discovered that the heat generated by merely placing a human hand upon the barrel of bomb 12 results in sufficient heat flowing into the vessel to cause actuation of the mechanism. The apparatus is convenient for use because it is not necessary to disconnect a pressure gage from the bomb each time a measurement is made. through the use of the automatic adjusting apparatus illustrated in Figure 4 inaccuracies due to errors made by the operator are reduced to a minimum. This instrument is readily manipulated even by an unskilled operator.

While this invention has been described in connection with present preferred embodiment thereof it is to be understood that this description is illustrative only and not intended to limit the invention.

Having described my invention, I claim:

1. Apparatus for determining the pressure of fluids comprising, in combination, a pressure balance indicator including a casing defining a diaphragm chamber, a diaphragm mounted in said chamber, first and second apertured plate mounted in said diaphragm chamber on opposite sides of said diaphragm, a contact arm insulatedly mounted in said casing, one end of said contact arm extending through the aperture of one of said plates into a closely spaced position with respect to said diaphragm whereby flexure of said diaphragm results in engagement of said diaphragm with said contact arm, means adapted to connect a source of fluid to be measured to one side of said diaphragm chamber, a source of balance pressure, means for varying the magnitude of said balance pressure, means for measuring said balance pressure, means connecting said source of balance pressure to the other side of said diaphragm chamber, and means for indicating engagement of said diaphragm with said contact arm, said last-mentioned means comprising a first electron tube having at least an anode, a cathode and a control grid, a source of alternating voltage applied across the anode and cathode of said first tube, a second electron tube having at least an anode and a cathode, the anode of said second tube being connected to the cathode of said first tube and the cathode of said second tube being connected to the anode of said first tube, an electrical discharge device connected in parallel with said second tube, means connecting the control grid of said first tube to a point of fixed reference potential when said diaphragm is in electrical contact with said contact arm whereby said first tube is conductive during a preselected period of the first half cycles of said applied voltage, said second tube being conductive during a preselected period of the second half cycles of said applied voltage, a voltage dividing network connected in circuit with said voltage source, means connecting the control grid of said first tube to a point on said voltage dividing network when said diaphragm is not in electrical contact with said contact arm whereby said first tube is non-conductive during both half cycles of applied voltage and said discharge device is actuated during a preselected period of said first half cycles of applied voltage.

2. Apparatus for determining the pressure of fluids comprising, in combination, a pressure balance indicator including a casing defining a diaphragm chamber, a diaphragm mounted in said chamber, first and second apertured plates mounted in said diaphragm chamber on opposite sides of said diaphragm, a contact arm insulatedly mounted in said casing, one end of said contact arm extending through the aperture of one of said plates into a closely spaced position with respect to said diaphragm whereby flexure of said diaphragm results in engagement of said diaphragm with said contact arm, means adapted to connect a source of fluid to be measured to one side of said diaphragm chamber, a source of balance pressure, means for measuring said balance pressure and means for varying the magnitude of said balance pressure until equal to the pressure of the fluid to be measured as indicated by the position of said diaphragm, said last-mentioned means comprising electrically operated valve means in said means connecting said balance pressure to said diaphragm chamber, a first electron tube having at least an anode, a cathode and a control grid, a source of alternating voltage applied across the anode and cathode of said first tube, a second electron tube having at least an anode and a cathode, the anode of said second tube being connected to the cathode of said first tube and the cathode of said second tube being connected to the anode of said first tube, a first voltage dividing network connected in parallel with said first and second tubes, an electrical discharge device having at least an anode, a cathode and a control grid, said source of voltage being connected across the anode and cathode of said discharge device, the control grid of said discharge device being connected to a point on said first voltage dividing network, said valve means being actuated by flow of current through said discharge device, means connecting the control grid of said first tube to a point of fixed reference potential when said diaphragm is in electrical contact with said contact arm whereby said first tube is conductive during a preselected period of the first half cycles of said applied voltage, said second tube being conductive during a preselected period of the second half cycles of said applied voltage, a second voltage dividing network connected in circuit with said voltage source, means connecting the control grid of said first tube to a point on said second voltage dividing network when said diaphragm is not in electrical contact with said contact arm whereby said first tube is non-conductive during both half cycles of applied voltage and said discharge device passes current during a preselected period of said first half cycles of applied voltage.

3. Apparatus for determining the pressure of fluids comprising, in combination, a pressure balance indicator including a casing assembly defining a diaphragm chamber, a diaphragm mounted in said chamber, a contact arm insulatedly mounted in said casing, one end of said contact arm extending into a closely spaced position with respect to said diaphragm whereby flexure of said diaphragm results in engagement of said diaphragm with said contact arm, means adapted to connect a source of fluid to be measured to one side of said diaphragm chamber, a source of balance pressure, means for varying the magnitude of said balance pressure, means for measuring said balance pressure, means connecting said source of balance pressure to the other side of said diaphragm chamber, and means for indicating engagement of said diaphragm with said contact arm, said last-mentioned means comprising a first electron tube having at least an anode, a cathode and a control grid, a source of alternating voltage applied across the anode and cathode of said first tube, a second electron tube having at least an anode and a cathode, the anode of said second tube being connected to the cathode of said first tube and the cathode of said second tube being connected to the anode of said first tube, an electrical discharge device connected in parallel with said second tube, means connecting the control grid of said first tube to a point of fixed reference potential when said diaphragm is in electrical contact with said contact arm whereby said first tube is conductive during a preselected period of the first half cycles of said applied voltage, said second tube being conductive during a preselected period of the second half cycles of said applied voltage, a voltage dividing network connected in circuit with said voltage source, means connecting the control grid of said first tube to a point on said voltage dividing network when said diaphragm is not in electrical contact with said contact arm whereby said first tube is non-conductive during both half cycles of applied voltage and said discharge device is actuated during a preselected period of said first half cycles of applied voltage.

4. Apparatus for determining the pressure of fluids comprising, in combination, a pressure balance indicator including a casing assembly defining a diaphragm chamber, a diaphragm mounted in said chamber, a contact arm insulatedly mounted in said casing, one end of said contact arm extending into a closely spaced position with respect to said diaphragm whereby flexure of said diaphragm results in engagement of said diaphragm with said contact arm, means adapted to connect a source of fluid to be measured to one side of said diaphragm chamber, a source of balance pressure, means for measuring said balance pressure and means for varying the magnitude of said balance pressure until equal to the pressure of said first source of fluid as indicated by the position of said diaphragm, said last-mentioned means comprising electrically operated valve means in said means connecting said balance pressure to said diaphragm chamber, a first electron tube having at least an anode, a cathode and a control grid, a source of alternating voltage applied across the anode and cathode of said first tube, a second electron tube having at least an anode and a cathode, the anode of said second tube being connected to the cathode of said first tube and the cathode of said second tube being connected to the anode of said first tube, a first voltage dividing network connected in parallel with said first and second tubes, an electrical discharge device having at least an anode, a cathode and a control grid, said source of voltage being connected across the anode and cathode of said discharge device, the control grid of said discharge device being connected to a point on said first voltage dividing network, said valve means being actuated by flow of current through said discharge device, means connecting the control grid of said first tube to a point of fixed reference potential when said diaphragm is in electrical contact with said contact arm whereby said first tube is conductive during a preselected period of the first half cycles of said applied voltage, said second tube being conductive during a preselected period of the second half cycles of said applied voltage, a second voltage dividing network connected in circuit with said voltage source, means connecting the control grid of said first tube to a point on said second voltage dividing network when said diaphragm is not in electrical contact with said contact arm whereby said first tube is non-conductive during both half cycles of applied voltage and said discharge device passes current during a preselected period of said first half cycles of applied voltage.

5. A pressure balance indicator comprising a casing defining a diaphragm chamber, a first apertured circular plate of electrically insulated material positioned in one end of said chamber, said first plate having a smooth concave first face and a first recess around the periphery thereof, said first face and said first recess being on the side of said first plate away from said one end of said chamber, a metal diaphragm having a contact disk mounted at the center of the first side thereof, said diaphragm being positioned in said chamber adjacent the first face of said first plate, the first side of said diaphragm being away from said first plate, a ring having a flange at the periphery thereof, said ring being positioned so that said flange engages said first recess, whereby said ring retains said disk in engagement with said first plate, a second apertured circular plate having a smooth concave first face and a recess at the periphery thereof, said second plate being positioned in said chamber so that the first face thereof is adjacent the first side of said diaphragm and the recess therein engages said ring, an apertured plug threaded in said casing to engage the second face of said second plate to retain said plates and diaphragm in the positions described, and a contact arm insulatedly mounted within said casing, one end of said contact arm extending through said plug and through the aperture in said second plate into closely spaced relationship with said disk.

References Cited in the file of this patent

UNITED STATES PATENTS

| | | |
|---|---|---|
| 2,352,881 | Avigdor | July 4, 1944 |
| 2,540,377 | Pachaly | Feb. 6, 1951 |
| 2,542,905 | Cromer et al. | Feb. 20, 1951 |
| 2,567,519 | Livingston | Sept. 11, 1951 |
| 2,645,949 | De Boisblanc | July 21, 1953 |

OTHER REFERENCES

Article: "A New High-Speed Engine Indicator," by E. S. Taylor and C. S. Draper, published in Mechanical Engineering, vol. 55, 1933, pages 169–171. (Copy in Div. 36–73/115.)